United States Patent
Ramsey et al.

(10) Patent No.: US 8,984,012 B2
(45) Date of Patent: Mar. 17, 2015

(54) SELF-TUNING ALTERATIONS FRAMEWORK

(75) Inventors: William D. Ramsey, Redmond, WA (US); Benoit Dumoulin, Palo Alto, CA (US); Nicholas Eric Craswell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/528,411

(22) Filed: Jun. 20, 2012

(65) Prior Publication Data

US 2013/0346400 A1    Dec. 26, 2013

(51) Int. Cl.
*G06F 17/30* (2006.01)

(52) U.S. Cl.
USPC ........... 707/790; 707/687; 707/769; 707/713; 707/813; 707/821

(58) Field of Classification Search
CPC ................................................ G06F 17/30864
USPC ......... 707/705, 707, 687, 790, 769, 713, 813, 707/821
See application file for complete search history.

(56) References Cited

U.S. PATENT DOCUMENTS

| | | | |
|---|---|---|---|
| 7,617,202 B2 | 11/2009 | Brill et al. | |
| 7,630,986 B1 * | 12/2009 | Herz et al. | 1/1 |
| 7,636,714 B1 | 12/2009 | Lamping et al. | |
| 7,788,245 B1 * | 8/2010 | Eddings et al. | 707/705 |
| 7,818,332 B2 | 10/2010 | Olds et al. | |
| 8,082,264 B2 | 12/2011 | Bierner | |
| 8,103,667 B2 | 1/2012 | Azar et al. | |
| 2007/0094255 A1 * | 4/2007 | Acharya et al. | 707/5 |
| 2010/0306249 A1 * | 12/2010 | Hill et al. | 707/769 |
| 2011/0264647 A1 * | 10/2011 | Lu et al. | 707/713 |
| 2011/0295897 A1 | 12/2011 | Gao et al. | |

OTHER PUBLICATIONS

Li, et al., "Exploring Distributional Similarity Based Models for Query Spelling Correction", In Proceedings of the 21st International Conference on Computational Linguistics and the 44th Annual Meeting of the Association for Computational Linguistics, Jul. 2006, pp. 1025-1032; http://acl.ldc.upenn.edu/P/P06-1129.pdf.

* cited by examiner

*Primary Examiner* — Sana Al Hashemi
(74) *Attorney, Agent, or Firm* — Dave Ream; Doug Barker; Micky Minhas (57) ABSTRACT

Embodiment described herein are directed to an enhanced search engine with multiple feedback loops for providing optimal search results that are responsive a user's search query. The user's search query is parsed, and based on the underlying terms, different linguistic models and refinement techniques generate alternative candidate search queries that may yield better results. Searches are performed for the original search query and the candidate search queries, and different scores are used to select the best search results to present to the user. Results making it onto the list, as well as the underlying candidate search query, linguistic model, or refinement technique for generating that search query, will have their corresponding scores updated to reflect their success of generating a search result. Scores are stored and used by future searches to come up with better results.

20 Claims, 6 Drawing Sheets

SELF-TUNING ALTERATIONS FRAMEWORK

BACKGROUND

Web searching has come a long way but can still be very frustrating for Internet users. Navigating to useful information using a modern search engine still largely hinges on the accuracy of the user's search terms. Unfortunately, there is little structure to search queries, which consist predominately of a few keywords the user believes captures his or her intent. Instead of phrasing search queries in complete sentences, search queries usually include the fewest number of words a user believes summarize the user's question to be answered online; for example, "Where is the best pizza place in Seattle?" becomes "Best Pizza Seattle." When search terms yield few results or results far different than the user's intent, users have little recourse than to enter better terms. For all the technological advancements in modern search engines, people are stuck with a relatively rudimentary approach to find what they want other than entering keywords, hunting through returned results, and trying alternative keywords when the results do not include desired information. Such an approach is effective when the user specifies a search query in the correct manner but can be frustratingly ineffective when not.

Also, not all search queries are error free (grammatically or typographically) or include keywords that properly reveal a user's search intent. Search engines are tasked with finding results for all kinds of queries, no matter how poorly written or far from the point a user's keywords. The effectiveness of search results are judged not by the actual keywords but on how well the results produce the information the user desires. Helping users accurately and quickly find online information is the lifeblood of today's search engines.

SUMMARY

This summary is provided to introduce a selection of concepts in a simplified form that are further described below in the Detailed Description. This summary is not intended to identify key features or essential features of the claimed subject matter. Nor is this summary intended to be used as an aid in determining the scope of the claimed subject matter.

One aspect is directed to a self-tuning, feedback-oriented search engine that provides optimized search results in response to a user's search query. One embodiment takes a submitted search query and run various linguistic models to generate alternative candidate search queries that, when processed, may uncover better results for a user. The linguistic models may create the candidate search queries by curing misspellings in the user's query, adding or deleting search terms, modifying search terms (e.g., synonyms, homonyms, etc.), refining to a certain geographic location or vertical, or performing a whole host of other modifications to the user's search terms. One embodiment performs a search for the candidate search queries in addition to searching for the original search query from the user. Interaction scores quantifying users' historical interactions with the results are used in selecting results to include in the list of search results. Results stemming from the search query and the candidate search query are usually included in the search results list. Selection of the results to include may also be predicated on various calculated probabilities using the interaction score and candidate scores, the latter indicating how frequently candidate search query or underlying generation model has produced results that end up on search results lists. So, in effect, the use of candidate search results provides a way to conduct multiple, simultaneous searches with different variant search terms without the user knowing. Eventually, the search results list is transmitted to a client computing device for display to the user.

Another aspect is directed to storing, updating, and maintaining candidate scores and interaction scores for a plurality of candidate search queries. Whenever results stemming from a candidate search query are used in a search results list or are interacted with by a user the candidate score corresponding to the candidate search query is updated. One embodiment simply increments the corresponding candidate score. Additionally, candidate scores may also, or alternatively, account for the underlying linguistic model (e.g., spell checker, synonym generator, geographic refinement, vertical refinement, etc.) used to generate a candidate search query that successfully produced results landing on a search results list. Embodiments also update interaction scores for a particular search result, candidate search query, or linguistic model whenever a user interacts with the particular search results. For example, if a user clicks a link of a search result, embodiments will update the corresponding interaction score to that result.

Still another aspect is directed to a server capable of running different components of an enhanced, self-tuning search engine. A candidate generator determines candidate search queries that are variants of a submitted search query. A probability generator determines probabilities that including results stemming from searches of the candidate search queries will result in a user interaction with the results. These probabilities may be based on different interaction scores and candidate scores associated with either the results or the candidate search queries. A blending module assembles the search results for a search results based on the probabilities, using a machine-learning algorithm. The search results list may include results from searches of the search query or the candidate search queries, in some embodiments without the user knowing the candidate search queries were even searched.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments described herein generally relate to an enhanced search engine that provides optimal lists of search results in response to a search query. The relevancy of search results is enhanced using alternative candidate search queries that are variants to a user's original search query. Variations of a search query are used along with the original search query to results. The variant search queries, referred to herein as "candidate search queries," may include any number of modifications to the search terms of the original search query or may include different refinements or improvements. The terms themselves may be altered, such as to correct spelling, provide better-yielding synonyms or homonyms, or in other ways to produce the candidate search queries. Also, geographic locations, verticals, time/date, personal or profile data, or other non-term information may be used when generating the candidate search queries. Some embodiments search for online resources using the original search query and/or the candidate search queries. The results of either or both may be blended into a list of search results, which is then transmitted to the inquiring client computing device for display to a user.

In one embodiment, the search query is received and search terms of the search query are parsed. A candidate generator analyzes the search terms and generates candidate search queries with variant or equivalent terms to the original search query. Each candidate query may be assigned a candidate score indicating the likelihood that the candidate query will replace the search query. While discussed at length below, candidate scores may be based on the number of times a candidate search query has been historically included in similar search results and/or when search results stemming from the candidate search query have produced results users have selected or otherwise interacted. The selection of candidate search queries may also use interaction scores, also discussed at length below, that are based on whether users have historically interacted or accessed particular online resources on a search results list. Using the candidate and/or interaction scores, a group of candidate search queries is obtained, and each candidate search query is searched, without the user's knowledge, in order to find an optimal list of results to the search query.

Another embodiment monitors, updates, and maintains candidate and/or interaction scores associated with candidate search queries and user interactions with online resources presented in search results lists. A candidate search query may have a candidate score indicative of the usefulness of the candidate search query to generate results for which users are searching. Put another way, a candidate search query's candidate score represents a probability that the user meant to search for the candidate search query instead of the originally submitted search query. Similarly, interaction scores register the number of times, or some like indication, that users have historically interacted with a particular online resource or search result. The embodiment can therefore increment, decrement, or otherwise manage candidate scores and interaction scores for a multitude of candidate search queries used in servicing search queries from different users of a given search engine. By monitoring the candidate scores and interaction scores, an optimal group of candidate search queries can be obtained and used to find ideal search results that will satisfy the user search query. The optimal search results list may include not only results directed to the original search query but also results stemming from the group of candidate search queries, as well. This optimal list can thereafter be transmitted to the requesting client computing device for display to the user in a web browser.

Another aspect uses one or more processors to execute instructions stored in computer-storage media or some type of memory to produce candidate search queries with variant terms relative to a user's search query. A candidate generator determines the variant terms, which are based on the search query's terms, and assembles the variant terms into different candidate search queries. A probability generator determines probabilities for each candidate search query being usable in replacing the original search query. These probabilities may be based on a whole host of parameters, such as, for example but without limitation, candidate scores, interaction scores, or different weightings given to either or both. To generate the probabilities, candidate search queries may need to be performed or searched and interaction scores for the returned online resources may be analyzed to determine whether to include any of the online resources in the search results list. A blending module constructs the search results list based on the probabilities that the candidate search queries should replace the original search query and also based on the interaction scores for the returned online resources stemming from the candidate search queries.

Having briefly described an overview of some of the embodiments, some key definitions should be explained further. As used herein, "online resources" refers to any electronic file (e.g., document, video, audio, image, program, and the like) that is accessible over a network. Examples of online resources include, without limitation, any web page, web site, or online image, video, audio, document, or the like. Search results provide links to different online resources that are hopefully responsive to a user's search query. One skilled in the art will appreciate and understand that online resources may encompass various different files and types of information available online.

One skilled in the art will also understand that a "search query" refers to a set of terms, or key words, submitted by a user to a search engine or some type of search function online. For example, a user may be searching for the newest Jaguar automobile by submitting search terms "new Jaguar." Search queries mainly consist of nouns or adjectives that describe the intent or concept for which a user is looking. Search queries are no longer limited to text, as modern search engines can now search for online resources relevant to images, audio, video, or portions thereof.

A "candidate search query" refers to an alternative search query than the one submitted by a user. Candidate search queries may include different terms, particular geographic locations, time and date parameters, user-profile biases, e-commerce transaction data, synonyms, homonyms, verticals (e.g., images, news, finances, etc.), alternative or corrected spellings of search terms, popular search terms, trending search terms, or other refinements to the terms of an original search query. In other words, a candidate search query provides an alternative to the original search query in the hopes that the alternative will provide better search results to the user.

Candidate search queries may include corrected (typographical, spelling, or grammatical) terms to the original search query generated from different linguistic models or refinement techniques. For example, if a user submits "Jagyar" in the hopes of finding out information about Jaguars, a candidate search query may be generated spelling the search term correctly, i.e., "Jaguars." Spellcheckers may be accessed and used to provide such variant terms. Spelling mistakes may occur without typographical errors but just in using improper forms of a particular word having multiple different meanings. For example, a user submitting a query on how to stop nose bleeds may accidentally spell the search query as "knows bleed cures," and a decent candidate search query may then be "nose bleed cures." The candidate search query therefore accounts for the correct form or spelling of a given search term so that a user need not reenter a corrected search query.

Candidate search queries may also replace entire search terms with different search terms. For example, a search for "Seattle NFL team" may result in a candidate search query that includes the NFL team in Seattle: "Seattle Seahawks." Additional terms may also be added to provide different context to candidate search queries. For example, a search for "Jaguars" may not be entirely clear on what the user is actually hunting. The user may be looking for information about Jaguar the vehicle, the NFL team Jacksonville Jaguars, the animal, or some other reference to Jaguars. In this case, the following candidate search queries may be generated: "Jaguar cars," "Jacksonville Jaguars," "Jaguar animals," and "Jaguar." So, as can be seen, the original search query is included as well as additional candidate search queries that modify the original search query by adding other terms to clarify different intents or contexts for searching. Again, it goes without saying that different variations other than the ones described above are fully contemplated by different embodiments, as there are different reasons for including, modifying, or eliminating terms of the original search query. Candidate search queries may also include terms that are synonyms and/or homonyms or other variants of terms in the original search query. For example, "Jaguar" could become "Panther," or "sell phone" could become "cell phone."

Candidate search queries may also take into account different geographic locations, verticals, or related searches. In one embodiment, a designation of a particular geographic location is added to a candidate search query, for example, "pizza" becomes "pizza Belleview." The geographic locations may be specific to the user for users profile or specific to trending search queries about a certain location. To illustrate the latter, suppose a famous Hollywood celebrity was recently in a catastrophic car crash. A user's search query may search for the celebrity by name while a candidate search query may add the terms "Hollywood car crash" to the celebrity's name because an inordinate amount of search queries were recently (e.g., within 24 hours) submitted about the celebrity's car crash.

Verticals may be specified in candidate search queries to focus search results on a certain type or context of information. For example, the search query "babies" may become "baby images." Virtually any type of vertical may be added to terms of a candidate search query. Examples include, without limitation, news, finance, images, videos, audio, books, real estate, weather, or other type of vertical.

Candidate search queries may also include related searches, which refer to alternative search terms commonly suggested to users who enter a particular search query. For example, a user searching simply for the "last model" of a particular car may trigger a candidate search query that includes the actual year (2009, 2010, etc.) that the automobile was made. Obviously, different variations of the examples provided are contemplated by various embodiments, which should not be limited to the illustrative examples mentioned above.

Candidate search queries may also include terms that indicate different intents than the intents indicated in an original search query. One skilled in the art will understand that search queries are just a manifestation of a user's intent to find or locate online information about a certain topic or subject. Ascertaining the intent of a search query, while somewhat easier for humans, can be quite difficult for computing devices. Dictionaries, thesauri, or other reference material may be accessed in order to understand the underlying meaning of different search terms in a search query. And the underlying meaning may imply or indicate what the intent of a search query. Yet, just as users are not always proficient at entering terms of a search query, users sometimes struggle with providing terms that grasp their intent for information. Going back to a previously discussed example, a user may want to learn more about Jaguar cars but may only enter search term "Jaguar," thinking that the search engine will know what is on the user's mind. To come up with accurate candidate search queries, one embodiment will access different online reference materials to understand that Jaguars may be descriptive of several different intents, including, for example, automobiles, animals, professional sports teams, amateur sports teams, clothing, furs, or other intents. To make sure a breadth of search results are returned and displayed, candidate search queries from different intents may be suggested and eventually used to suggest search results. Following the example above, the following candidate search queries may be suggested: "Jaguar car," "Jacksonville Jaguars," "Belleview Jaguar Bowlers," "Jaguar Furs," and "Jaguar Patterned Clothes." Thus, a plurality of results will be searched for and assembled into a search results list.

Before proceeding, it should be noted that the previous discussion of different ways to generate candidate search queries is provided merely for explanatory purposes. Other alternative linguistic models and refinement techniques may be used. Also, combinations of the above linguistic models and refinement techniques may be used to generate candidate search queries. Embodiments are not limited to any particular linguistic model or refinement technique, as different embodiments will use different ways for generating candidate search queries.

Moving forward, "user interactions," refer to different interactions between a user and one or more search results. User interactions may include things such as mouse clicks, mouse hovers, touch gestures, virtualized movements, camera-captured movements, or the like. For example, it is commonly thought that a user's eyes generally follow a mouse cursor when the user is searching for information online. So it naturally follows that a user who hovers a mouse cursor over a hyperlink to a search result is looking at the search result. Hovering a mouse cursor for a specified amount of time, or any amount of time, can therefore be interpreted as a user being interested in the specific search result. Just as a mouse click on the search result indicates some level of success for choosing the search result, a mouse hover may do the same. As client devices become more complex, ways of interacting with user interfaces have evolved to touch screens and virtualized environments that monitor a user's movements. Along these lines, a user may drag two fingers across a touch screen in opposite directions to perform a zoomed in movement, implying that the zoomed in search result is somewhat important to the user. Other types of gestures or movements may also or alternatively be used as an indication of a user's interest in a particular search result. User interactions, in one embodiment are eventually stored and analyzed in order to provide valuable data about the efficacy of particular search results or the candidate search queries from which the search results came.

User interactions may be captured or somehow represented in an "interaction score" indicative of the success of a search result measured by a user's interaction. Some embodiments increment or decrement interaction scores based on corresponding search results being presented on a search results page and being interacted with or ignored. Interaction scores may include the online resource, search result, candidate search query, original search query, or other designation. In addition, an interaction score may include specific information relative to a search user, such as, for example but without limitation, demographics, geographic locations, e-commerce transactions, social networking profiles, or the like. Other types of user-specific data may also be captured and stored for interaction scores.

"Candidate scores" refer to metrics assigned to specific candidate search queries. In effect, candidate scores indicate how effective candidate search queries are for replacing user search queries. Candidate scores may be based on the number of times a result for a candidate search query ends up on a search results page or receives some sort of user interaction (e.g., mouse click, mouse hover, touch gestures, etc.). Candidate scores may vary based on the underlying search query terms used to generate a candidate search query. For example, a candidate search query of "Jaguars animal" will have a higher, or more deferential, candidate score when the underlying user search query is "Jaguars wildlife" than if the underlying search query is "Jaguars football." In other words, candidate scores may vary based on the context of a user's search query, or possibly the underlying intent.

As used herein, "modules" refer to a computer-related entity, either hardware, software (e.g., in execution), and/or firmware. Modules may operate in a client-server relationship to carry out various techniques described herein. Such computing is commonly referred to as "in-the-cloud" computing. For example, a module may be a process running on a processor, a library, a subroutine, and/or a computer or a combination of software and hardware. By way of illustration, both an application running on a server and the server may be a component. One or more modules can reside within a process, and a module can be localized on a computing device (such as a server) or distributed between two or more computing devices communicating across a network.

An example operating environment in which various aspects of some embodiments may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, smartphone, digital phone, handheld device, BlackBerry®, personal digital assistant (PDA), or other device capable of executing computer instructions.

Embodiments include computer code or machine-useable instructions, including computer-executable instructions such as program modules, being executed by a computer or other machine, such as a PDA or other handheld device. Generally, program modules including routines, programs, objects, components, data structures, and the like, refer to code that perform particular tasks or implement particular abstract data types. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

Figure 1:
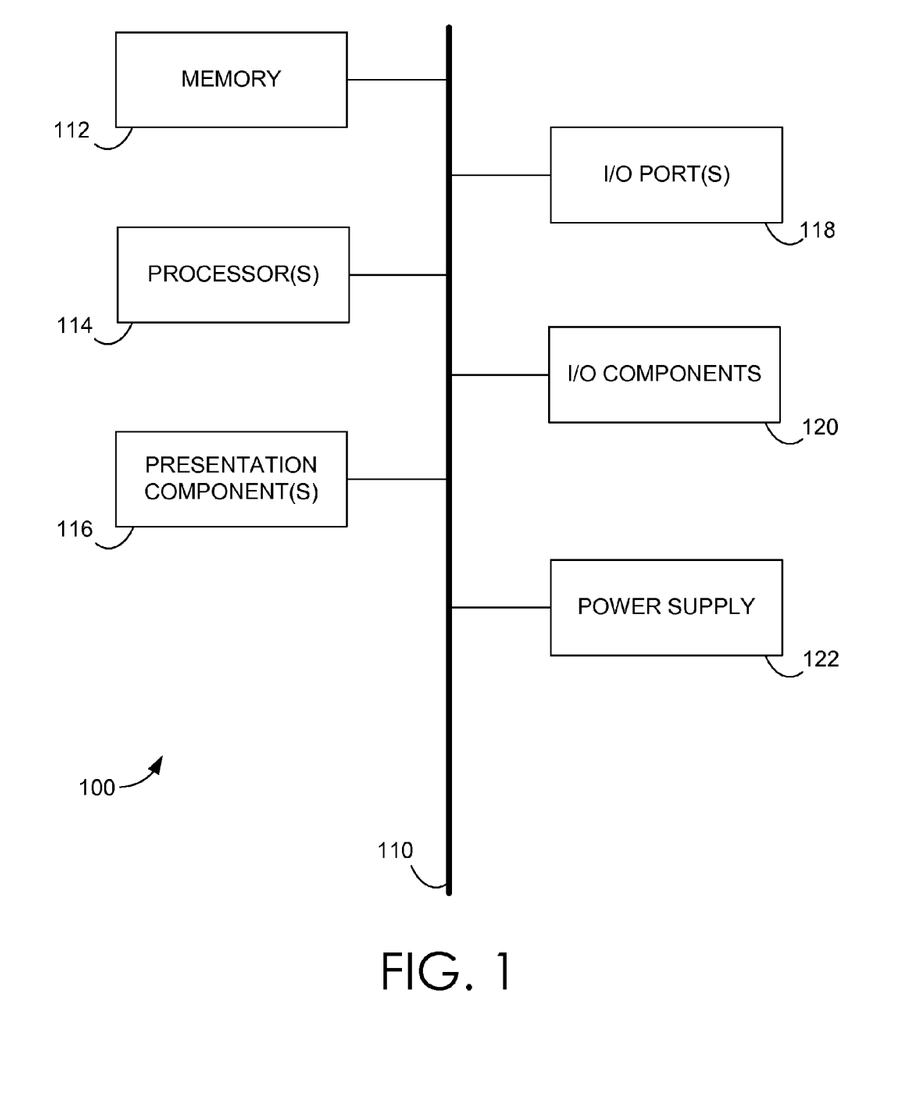
FIG. 1 illustrates a block diagram of an exemplary computing environment suitable for implementing embodiments discussed herein.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

Within memory 102, computing device 100 may have stored web browser and a web browser toolbar or other extension. One skilled in the art will understand and appreciate that various web browsers may be stored, such as, for example, Internet Explorer® developed by the Microsoft Corporation®. Different search engines may offer various proprietary toolbars and extensions, such as, for example, Bing® Bar, Google® Toolbar, Yahoo !® Toolbar, or the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2A:
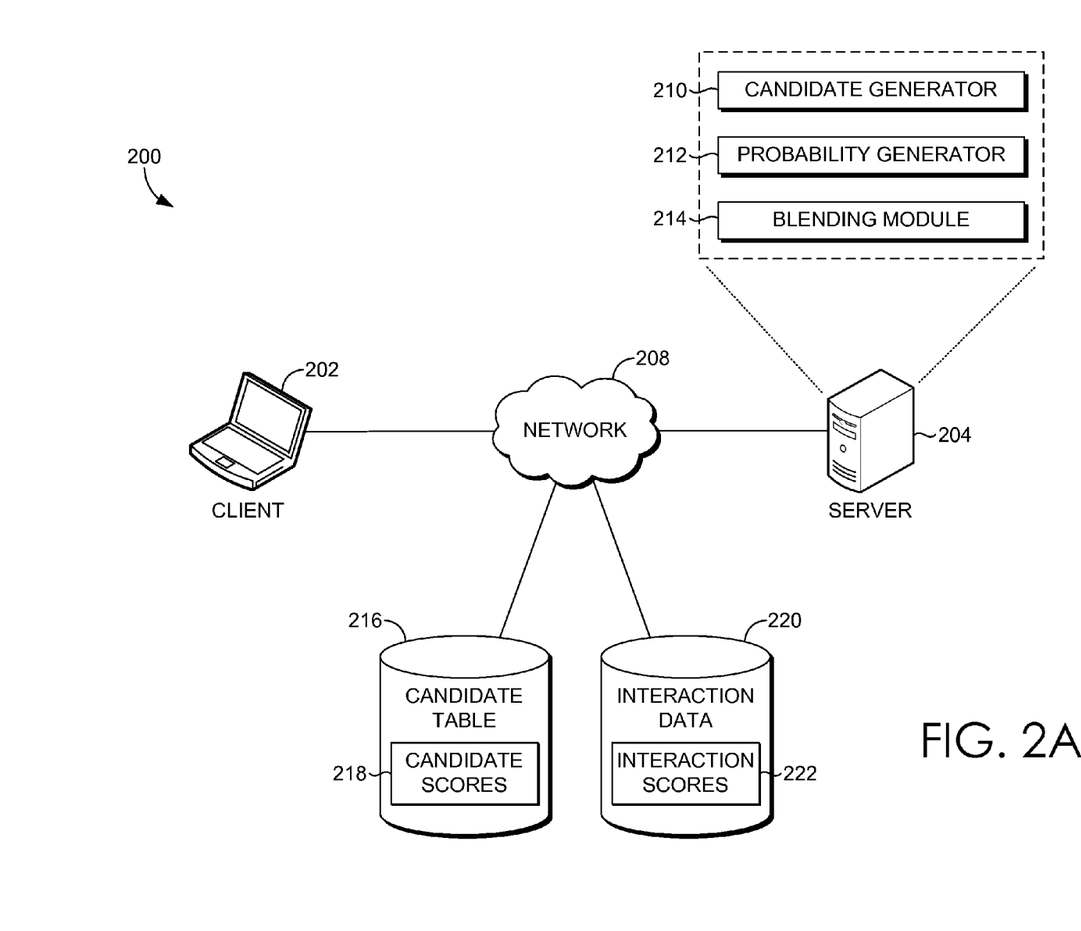
FIG. 2A illustrates a networked environment for providing an optimal list of search results in response to a search query, according to one embodiment.

FIG. 2A illustrates a network environment for providing an optimal list of search results in response to a search query, according to one embodiment. Networking environment 200 comprises a client computing device 202, server 204, and databases 216 and 220, each able to communicate across network 208. While any of the illustrated devices may communicate with each other, in operation, client computing device 202 communicates with server 204, which functions as a front-end or middle-tier server, and server 204 interacts with databases 216 and 220 that function as back-end depositories for different types of data. In one embodiment, server 204 hosts a search engine that receives requests for information in the form of search queries and returns results in the form of search results pages for display on client computing device 202.

Network 208 may include any computer network or combination thereof. Examples of computer networks configurable to operate as network 408 include, without limitation, a wireless network, landline, cable line, fiber-optic line, local area network (LAN), wide area network (WAN), or the like. Network 208 is not limited, however, to connections coupling separate computer units. Instead, network 208 may also comprise subsystems that transfer data between servers or computing devices. For example, network 208 may also include a point-to-point connection, the Internet, and Ethernet, a back plane bus, an electrical bus, or other internal system.

Client computing device 202 may be any type of computing device, such as device 100 described above with reference to FIG. 1. By way of example only and not limitation, client computing device 202 may be a personal computer, desktop computer, laptop computer, handheld device, mobile phone, smart phone, electronic tablet, handheld device, or the like. One skilled in the art will understand and appreciate that numerous devices may function as a client computing device in modern client-server computing models.

Client computing device 202 may include a web browser, such as Internet Explorer® developed by the Microsoft Corporation®. The web browser may include a toolbar, such as the Bing® Bar, with various web-browsing features. The web browser may also include an expression file that stores different mappings or tables of correlations between uniform resource locations ("URLs"), search engines, and indications of verticals either in the URLs or in a user's search query terms. In one embodiment, the expression file is updated regularly by a toolbar update component from server 204, either in a push, pull, or push-pull manner. The expression file may be stored as an extensible markup language ("XML"), text file, or other type of file capable of associating URLs with verticals and/or search terms.

Client computing device 202 may communicate with server 204 or databases 216 and 220 using a transfer protocol, such as, for example, the Hypertext Transfer Protocol ("HTP"), Hypertext Transfer Protocol Secure ("HTTPS"), file transfer protocol ("FTP"), Transport Layer Security ("TLS"), Secure Sockets Layer ("SSL"), or the like.

Server 204 may be any type of server (or servers) capable of hosting and supporting a search engine as well as candidate generator 210, probability generator 212, and blending module 214. Server 204 may be configured to store (either in cache, relationally on other servers or databases, or on a hard drive internal to server 204) and accesses different candidate search queries, candidate scores 218, and/or interaction scores 222—the latter two being shown as stored on databases 216 and 220.

Candidate generator 210 creates or locates different candidate search queries related to a user's search query. Using any of the techniques described above—spellchecking, synonyms, homonyms, verticals, geographics, user profile, intents, etc.—candidate generator 210, in one embodiment, obtains alternative queries to the user's search query. In one embodiment, probability generator 212 calculates different probabilities that a candidate search query obtained by candidate generator 210 will provide results that may better satisfy the user's query than the original search query. These probabilities may be based on a whole host of factors, such as candidate scores 218, interaction scores 222, any of the parameters described above, a combination thereof, or the like.

Machine-learning algorithms may be used to calculate and/or use the probabilities for the obtained candidate search queries to suggest what queries or resultant search results to include on an optimal list of search results to the user. Instead of relying solely on human relevance systems ("HRS") labels, embodiments described herein can dynamically determine which candidate search queries or corresponding search results to include on the optimal list based on probabilities calculated by probability generator 212. Bayes Theorem, noisy-channel models, or other statistical models may be used to determine the search results for the optimal list. Again, the determined search results may be based on candidate scores 218 and/or interaction scores 222, which represent the historical success of search results previously presented and the underlying candidate search queries used to generate those results.

Blending module 214 selects the results to include on the optimal list based on the probabilities. Considering an example embodiment using a noisy-channel model to blend results in a principled way, the probability that a user will click on a specific result given a search query may equal the probability that a candidate search query has produced a specific user interaction multiplied by the probability that the query terms of the search query result in one or more search results of the candidate search query. Other probabilities and combinations of probabilities are also contemplated and used by different embodiments.

Figure 2B:
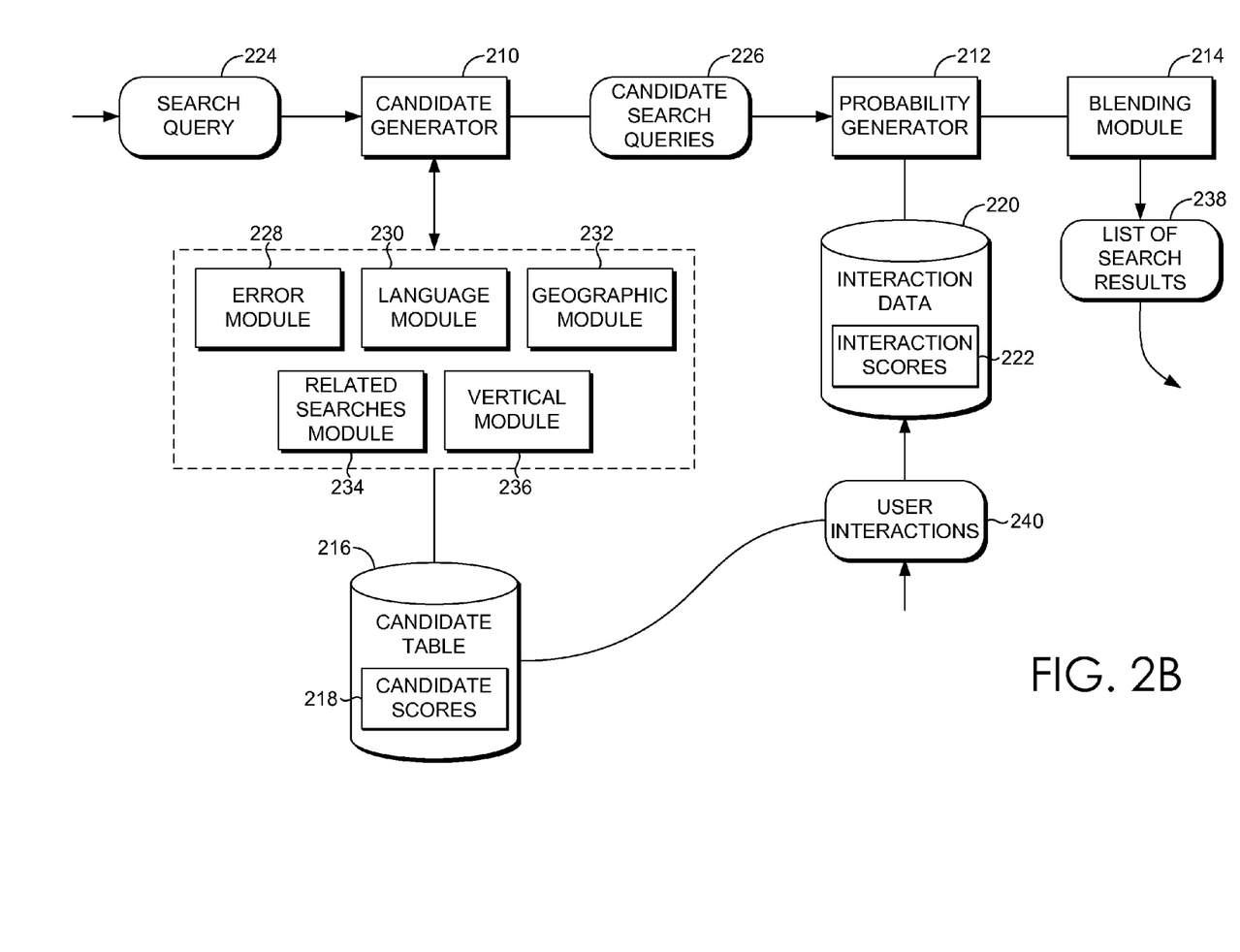
FIG. 2B illustrates an interactive view of the networked environment for providing an optimal list of search results in response to a search query, according to one embodiment.

FIG. 2B illustrates an interactive view of the network environment for providing an optimal list of search results in response to a search query, according to one embodiment. In general, the network environment shown in FIG. 2B illustrates the different interactions between an incoming search query 224 sent by client computing device 202 (not shown for clarity) as received by server 204, which interacts with databases 216 and 220. This illustration is meant purely for explanatory purposes, and is not provided to limit embodiments to any particular sequence of actions or steps.

Candidate generator 210 parses search query 224 for underlying key words and terms. These key words and terms are used to obtain or generate different candidate search queries that are, or may be, relevant to search query 224. To do so, candidate generator 210 accesses different modules capable of providing variant terms to the terms of search query 224. Candidate generator 210 employs different modules for determining variants of the terms or keywords in search query 224. These modules include error module 228, language module 230, geographic module 232, related searches module 234, and vertical module 236. These five modules, along with any modules executing any of the linguistic models described herein for providing variants or alternative terms for a candidate search query, generate different terms that the candidate generator 210 can use to create candidate search queries. Error module 228 provides detection of missing letters, switched letters, additional letters, or other types of spelling and typographical errors in the search terms submitted by the user. For example, "cel phone" may become "cell phone." Language module 230 provides lexical and phonemic variance of search terms. For example, "sell phone" becomes "cell phone." Geographic module 232 provides a location constraint to a search query for candidate search query. For example, "pizza nearby" becomes "pizza 64111." Related searches module 234 provides additional candidate search terms or queries that have been used in a similar or same queries in the past. Finally, vertical module 236 provides indications of verticals that may be relevant to candidate search queries.

The five modules shown in FIG. 2B may access and use a candidate table stored in database 216, which includes candidate scores 218 for different candidate search queries. Although not shown, some embodiments may direct candidate generator 210 to directly access the candidate table and candidate scores 218 in database 216 and use those scores in conjunction with terms specified by error module 228, language module 230, geographic module 232, related searches module 234, and vertical module 236. As previously discussed, different techniques may be used to come up with terms for candidate search queries, so while illustrative of one embodiment, other embodiments may include different modules capable of performing the generation or obtaining of variant terms for candidate search queries. In other words, embodiments are not limited to the modules shown.

Once generated or obtained, candidate search queries 226 are passed to the probability generator 212, which is cast with calculating different probabilities for the candidate search queries 226 and/or underlying search results. In addition to candidate search queries 226, one embodiment will also retrieve search results for each of candidate search queries 226 and pass those retrieved search results to probability generator 212. Probability generator 212 accesses the interaction scores 222, as well as any other interaction data, in database 220, and uses those scores and data to determine the likelihood a specific search result or candidate search query 226 should be used as a replacement to search results stemming from only the search query 224. To illustrate, consider again the example where a user simply enters "Jaguar" as search query 224. Candidate generator 210 may have come up with the following candidate search queries 226: "Jacksonville Jaguars," "Jaguar animals," "Jaguar cars." Probability generator 212 can then compute the conditional probability that one or several of the candidate search queries 226 should be used as a query for search results given the search query 224. Such probabilities may be based on the interaction scores 222, which represent indications of historical user interactions with search results stemming from terms, search queries, or candidate search queries. Additionally, other interaction data may be considered, such as information specific to the user, the user's social networking, the user's search patterns, the user's historical interactions, or other indications generally focused on the user. As shown, user interactions 240 are stored with the interaction data on database 220 and may be incorporated in interaction scores 222. Receipt, maintenance, and updating of the interaction data and interaction scores 222 will be ongoing and independent of answering search query 224 with search results.

Blending module 214 looks at the probabilities generated by probability generator 212 and selects search results to include in the optimal list of search results 238. Different machine-learning algorithms may be used to filter or select the list of search results 238, such as algorithms using Bayes Theorem, noisy-channel models, or other statistical models. In one embodiment, it may be ideal to only provide search results that have historically been popular with other users, meaning the search results have a high user interaction when compared to other search results. Other embodiments may not focus solely on search result popularity, instead looking to blend search results from candidate search queries of different intents. Blending module 214 may provide a balance between breadth of intent and popularity of search results.

Figure 3:
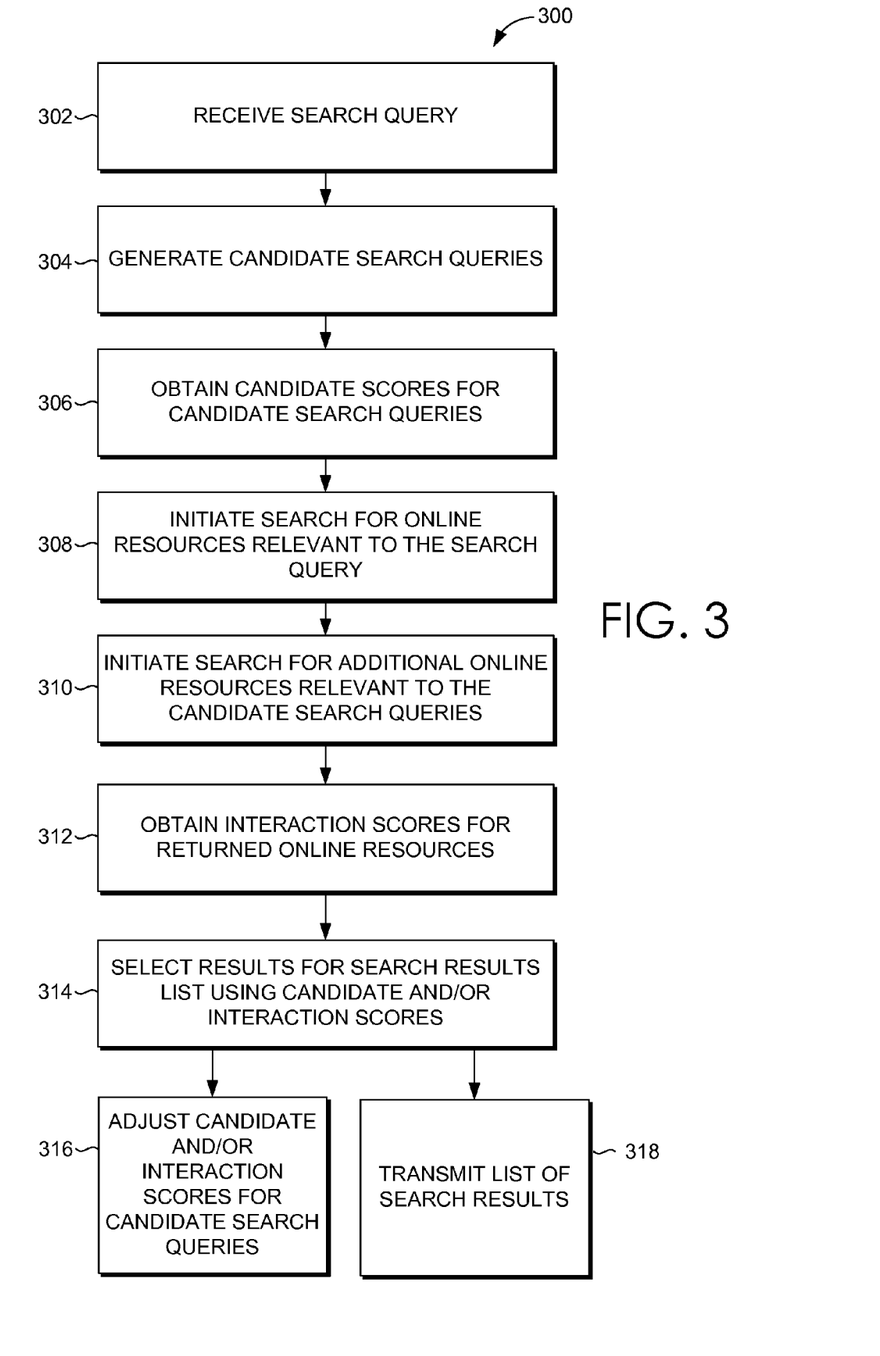
FIG. 3 illustrates a flow chart for providing an optimal list of search results in response to a search query, according to one embodiment.

FIG. 3 illustrates a flowchart 300 for providing an optimal list of search results in response to a search query, according to one embodiment. Initially, a search query comprising one or more search terms is received, as shown at 302. Different candidate search queries are obtained that relate to the search query and one or more search terms, as shown at 304, and candidate scores are obtained for the different candidate search queries, as shown at 306. In one embodiment, a search is initiated for different online resources that are relevant to the one or more search terms of the search query, as shown at 308. Similarly, searches are also initiated for additional online resources that are relevant to the candidate search queries, as shown at 310. Additional online resources simply refer to search results that are returned in response to a candidate search query being run. Also, interaction scores for the returned online resources—either for the original search query or the additional online resources for the candidate search queries—are obtained, as shown at 312. The candidate scores and/or the interaction scores may be used in selecting the results to include on the optimal list of search results, as shown at 314. One embodiment may also increment or decrement candidate scores and/or interaction scores for candidate search queries and corresponding search results that are included in the optimal list or not included in the optimal list, respectively, as shown at 316. Once assembled, the optimal list of search results is transmitted to a client computing device for display to a user in a web browser, as shown at 318.

Figure 4:
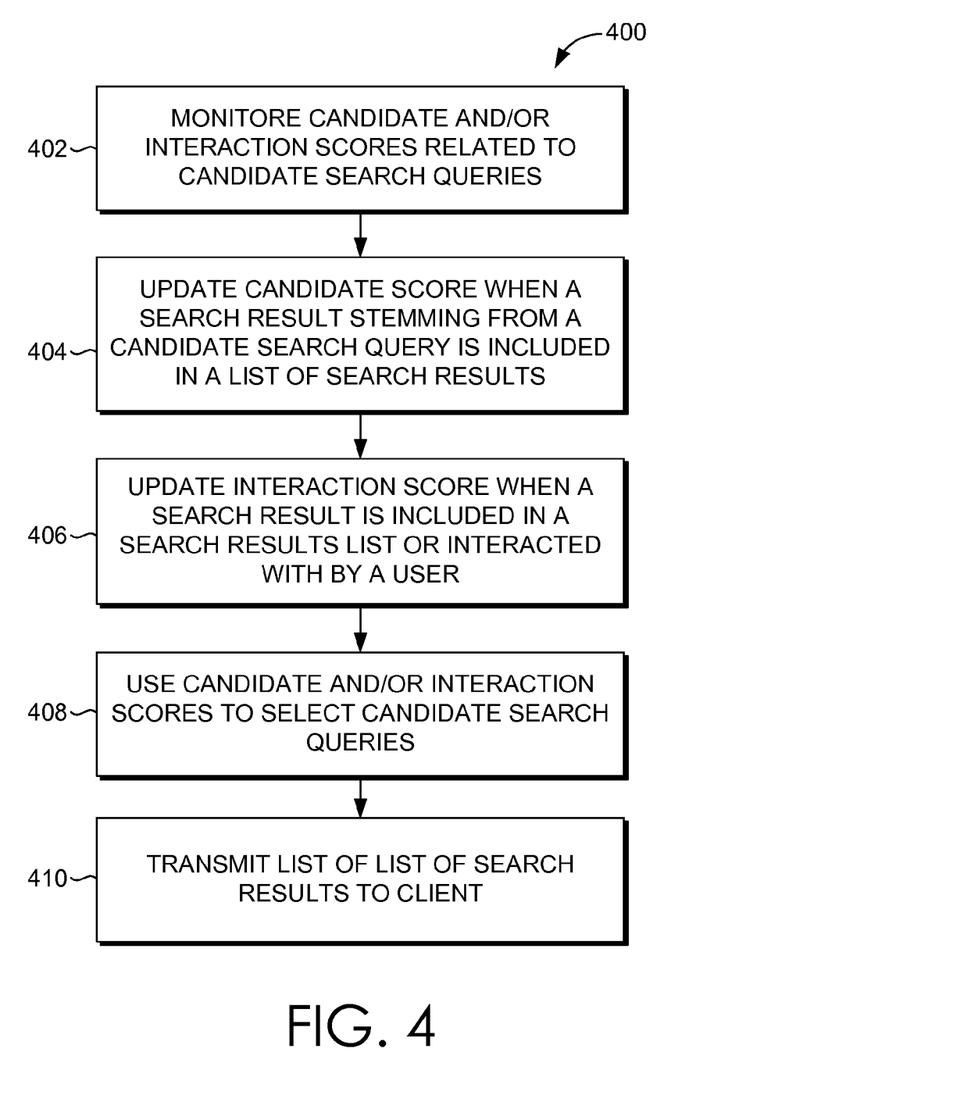
FIG. 4 illustrates a flow chart for managing candidate scores and interaction scores as well as for providing an optimal list of search results in response to a search query, according to one embodiment.

FIG. 4 illustrates a flowchart for managing candidate scores and interaction scores as well as for providing an optimal list of search results in response to a search query, according to one embodiment. Flow 400 includes monitoring candidate scores and interaction scores related to a plurality of candidate search queries, as shown at 402. As previously discussed, candidate scores and interaction scores may be tied to become or associated with different candidate search queries and corresponding search results. Whenever a search result of a candidate search query is included in a search result list or interacted with by a user, a candidate score may be updated, as shown at 404. Additionally, interaction scores may be monitored and updated whenever a search result is presented in a search results list and/or interacted with by a user, as shown at 406. While continually being monitored and updated, candidate scores and interaction scores may be used to select a group of candidate search queries to run in addition to or in lieu of a user-submitted search query, as shown at 408, and the list is transmitted to the client computing device of the user, as shown at 410. One embodiment will include search results stemming from at least one candidate search query in the optimal list of search results to be transmitted to the client computing device of the user.

Figure 5:
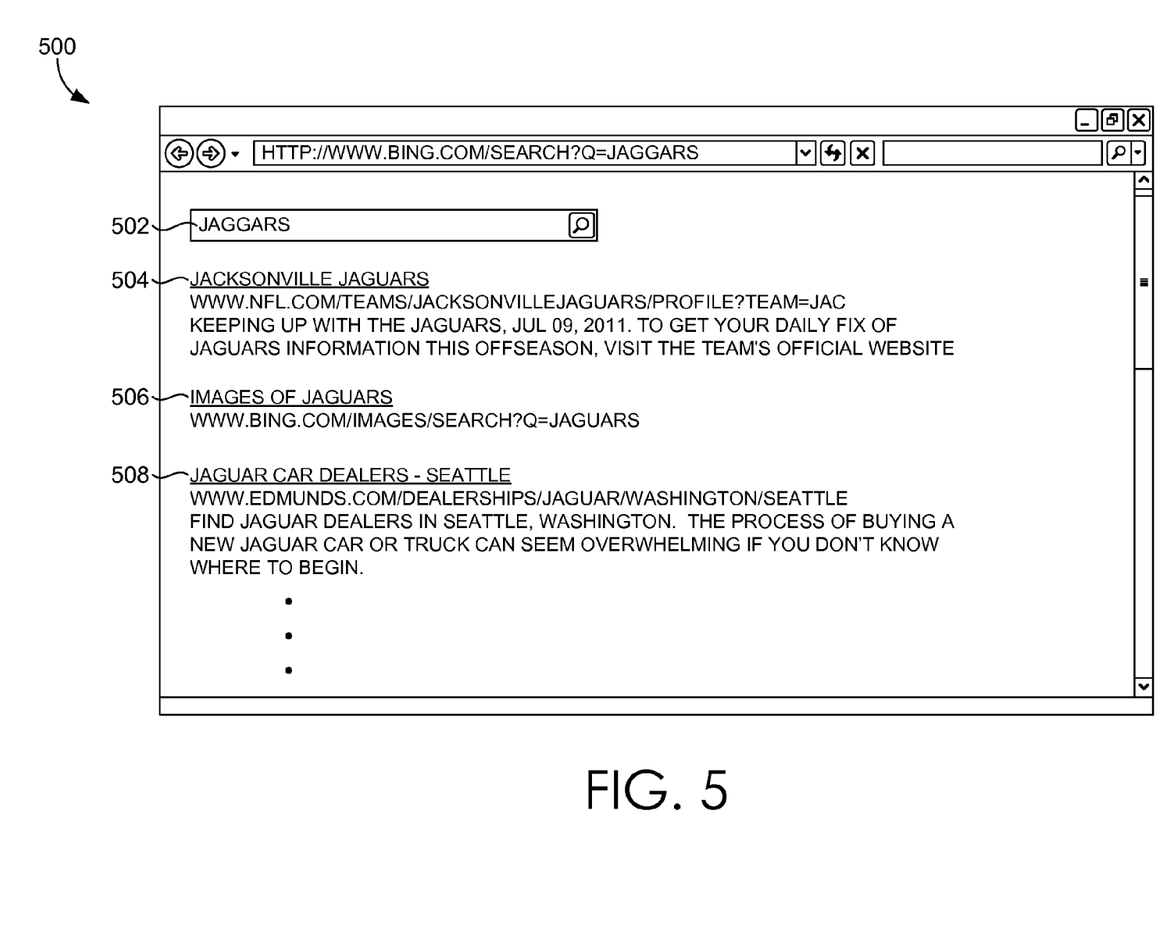
FIG. 5 illustrates a screen shot of a web browser rendering an optimal list of search results in response to a search query submitted by a user, according to one embodiment.

FIG. 5 illustrates a screenshot 500 of a web browser rendering an optimal list of search results in response to a search query submitted by a user, according to one embodiment. As shown, the user entered the search query "Jaggars," which is a misspelling of the term Jaguars. Once submitted to the search engine, embodiments translated the search query 502 into different candidate search queries. Candidate scores and interaction scores were used to determine which candidate search queries would be the most effective at replacing the misspelled search query 502. The misspelling was noted and different candidate search queries obtained that generated different search results 504-508 capturing various different intents that could be underlying the search query 502. Instead of simply asking the user to reenter a new search query or spell the search query 502 in a manner that appears to be correct, the embodiment shown not only ascertained alternative candidate search queries to run but also retrieved and blended results for the most likely search terms the user meant to include.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method, performed by one or more computing devices, for generating and transmitting search results responsive to a user search query from a user, the method comprising:
  receiving the user search query comprising one or more search terms;
  obtaining candidate search queries for the user search query, the candidate search queries corresponding to modifications of the one or more search terms;
  obtaining candidate scores for the candidate search queries, wherein a candidate score for one of the candidate search queries corresponds to a probability that the one of the candidate search queries is an effective replacement for the user search query;
  initiating a search for online resources relevant to the one or more search terms;
  initiating searches for additional online resources relevant to the candidate search queries;
  obtaining user interaction scores, wherein the user interaction scores are based on user interactions with the online resources and the additional online resources;
  based on the candidate scores and the user interaction scores, generating a search results list including search results that comprise one or more of the online resources and one or more of the additional online resources;
  incrementing the candidate scores for the candidate search queries associated with the one or more of the additional online resources included in the search results list; and
  transmitting the search results list as a response to the user search query.

2. A system, comprising:
  one or more processors;
  one or more computer-storage media; and
  executable instructions stored on the one or more computer-storage media and executable by the one or more processors to receive a search query and generate an optimal list of search results in response, comprising:
  (1) a candidate generator that determines one or more candidate search queries, each comprising variant terms corresponding to search terms of the search query,
  (2) a probability generator to determine probabilities that including results stemming from searches of the one or more candidate search queries in the optimal list of search results will result in a user interaction with corresponding online resources, wherein the probabilities determined by the probability generator are based on interaction scores and candidate scores for the one or more candidate search queries, wherein the interaction scores are based on user interactions with at least one of the results stemming from the one or more candidate search queries, and wherein the candidate scores correspond to probabilities that the one or more candidate search queries are effective replacements for the search query, and
  (3) a blending module to determine the search results for the optimal list of search results based on the probabilities determined by the probability generator.

3. One or more computer-storage media storing computer-executable instructions that, when executed by a processor, perform a method for generating search results responsive to a user search query from a user, the method comprising:
  receiving the user search query;
  generating a candidate search query that comprises an alternative search query based on the user search query;
  determining online resources responsive to the user search query and additional online resources responsive to the candidate search query; and
  based on a candidate score for the candidate search query, wherein the candidate score corresponds to a probability that the candidate search query is an effective replacement for the user search query, and user interaction scores for the online resources and the additional online resources, wherein the user interaction scores are based on user interactions with the online resources and the additional online resources, generating a list of search results that includes one or more of the online resources and one or more of the additional online resources.

4. A system, comprising:
  one or more processors;
  one or more computer-storage media; and
  executable instructions stored on the one or more computer-storage media and executable by the one or more processors to generate a list of search results responsive to a user search query from a user, comprising:
  a candidate generator that:
    generates a candidate search query comprising an alternative search query based on the user search query, and
    determines online resources responsive to the user search query and additional online resources responsive to the candidate search query;
  a probability generator that generates a first probability that including at least one of the additional online resources in the list of search results responsive to the user search query will result in a user interaction with the at least one of the additional online resources, wherein the first probability is based on a candidate score for the candidate search query, the candidate score corresponding to a second probability that the candidate search query is an effective replacement for the user search query, and user interaction scores for the online resources and the additional online resources, the user interaction scores based on user interactions with the online resources and the additional online resources; and
  a blending module that generates the list of search results, the list of search results including one or more of the online resources and one or more of the additional online resources, wherein the list of search results is generated based on the first probability generated by the probability generator.

5. The computer-implemented method of claim 1, wherein the probability is based on historical interactions of users with results stemming from the one of the candidate search queries.

6. The computer-implemented method of claim 1, wherein at least one of the candidate search queries includes terms that correspond to at least one of the following with respect to at least one of the one or more search terms: a synonym, an alternative spelling, a corrected spelling, and a homonym.

7. The computer-implemented method of claim 1, wherein at least one of the candidate search queries includes an indication for searching a particular vertical, the particular vertical corresponding to a particular type of information.

8. The computer-implemented method of claim 1, wherein at least one of the candidate search queries includes an indication for restricting results to a particular geographic location.

9. The computer-implemented method of claim 1, wherein at least one of the candidate search queries includes one or more related search queries related to a context of the user search query.

10. The computer-implemented method of claim 1, further comprising:
    receiving an indication of an interaction of the user with at least one of the search results on the search results list; and
    storing data associated with the interaction of the user with the at least one of the search results on the search results list.

11. The system of claim 2, further comprising at least one member of a group comprising:
    an error module to correct any misspellings in the search query; and
    a language module to generate the variant terms.

12. The system of claim 2, further comprising:
    a vertical module that generates a first set of candidate search queries refined to one or more verticals, the one or more verticals corresponding to media types comprising one or more of the following: an image, a video, and an audio file; and
    a geographic module that generates a second set of candidate search queries refined to a particular geographic location.

13. The computer-storage media of claim 3, further comprising:
    receiving an indication of a user interaction with one of the one or more of the online resources or one or more of the additional online resources; and
    based on the indication of the user interaction, updating an interaction score associated with the one of the one or more of the online resources or one or more of the additional online resources.

14. The computer-storage media of claim 3, further comprising:
    based on the generated list of search results including the one or more of the additional online resources responsive to the candidate search query, updating the candidate score for the candidate search query.

15. The computer-storage media of claim 3, further comprising:
    presenting the generated list of search results in response to the user search query.

16. The system of claim 4, further comprising a database that stores the candidate score for the candidate search query.

17. The computer-implemented method of claim 10, wherein the interaction of the user comprises at least one of the following interactions with at least one of the search results on the search results list: a mouse click, an initiation of a hypertext transfer protocol (HTTP) request, a mouse hover, a touch gesture, an image recognition, and a hyperlink selection.

18. The system of claim 11, further comprising a database capable of storing and updating the candidate scores and the interaction scores for the one or more candidate search queries.

19. The system of claim 4, wherein the candidate score for the candidate search query is updated based on the list of search results including the one or more of the additional online resources responsive to the candidate search query.

20. The computer-implemented method of claim 17, wherein the mouse hover indicates a length time a mouse pointer was hovered over the at least one of the search results on the search results list.

* * * * *